Figure 1:
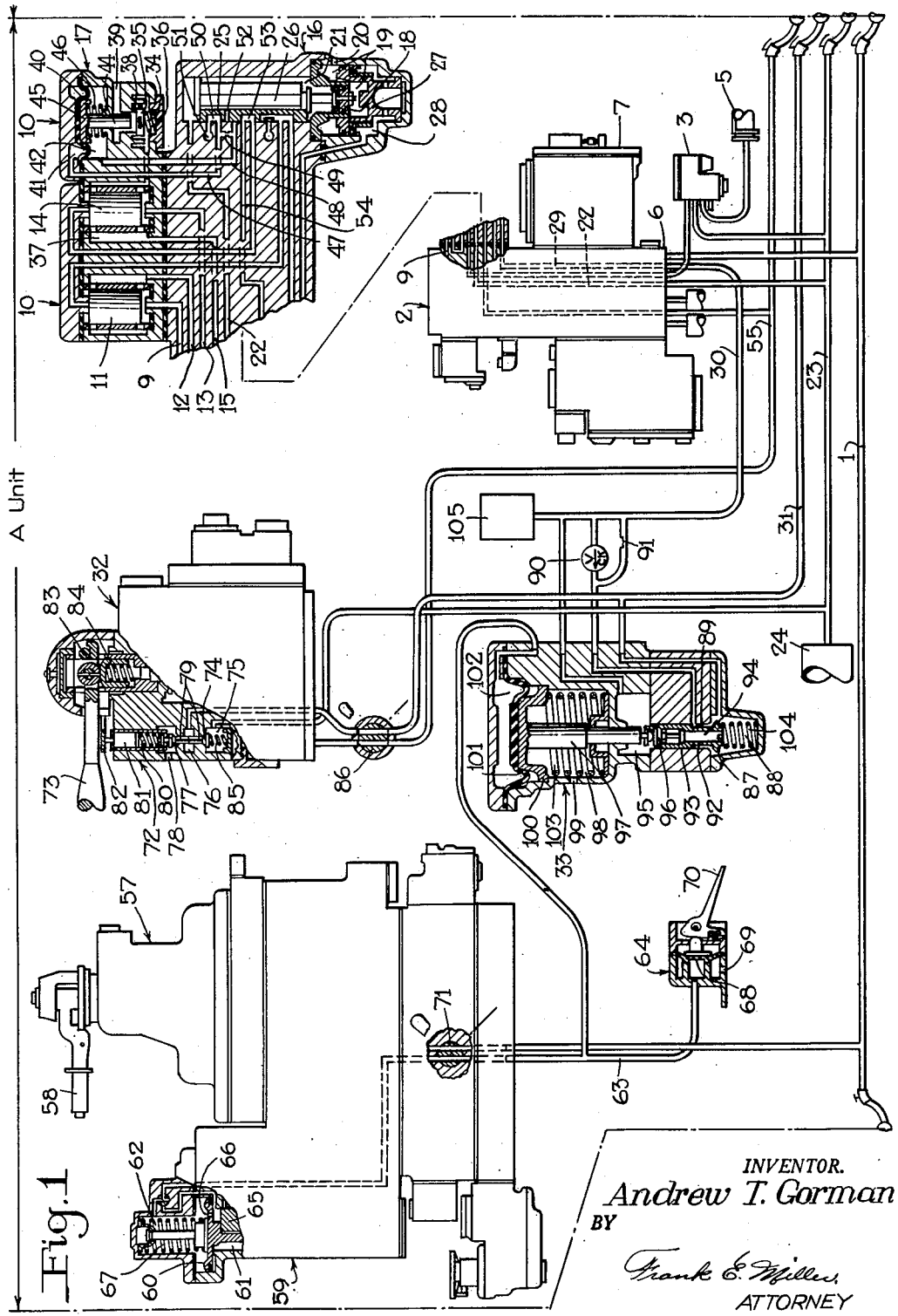

Feb. 26, 1952     A. T. GORMAN     2,587,039
FLUID PRESSURE BRAKE RELEASE CONTROL APPARATUS
Filed Oct. 21, 1949     3 Sheets-Sheet 1

INVENTOR.
Andrew T. Gorman
BY
Frank E. Miller
ATTORNEY

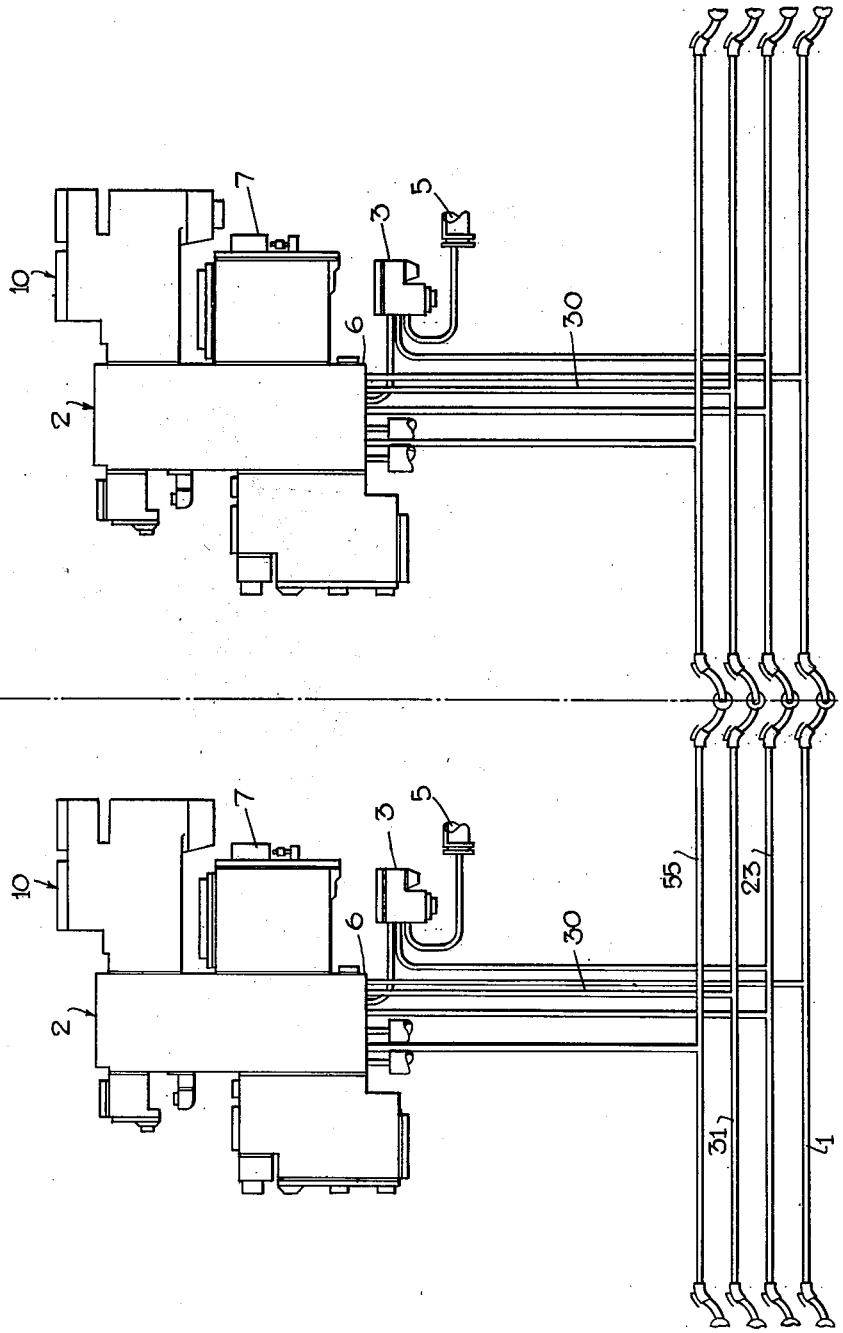

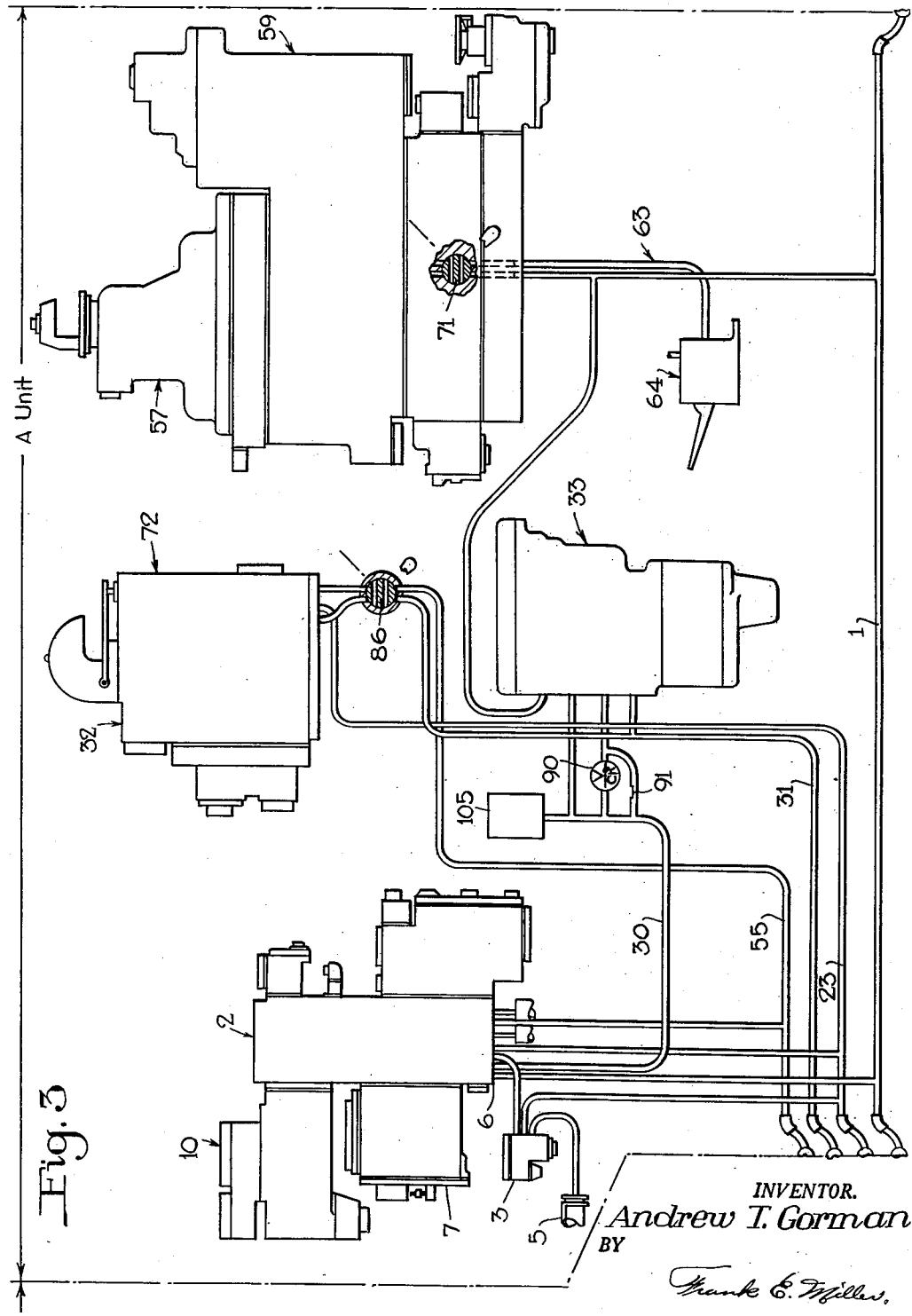

Patented Feb. 26, 1952

2,587,039

UNITED STATES PATENT OFFICE 2,587,039

FLUID PRESSURE BRAKE RELEASE
CONTROL APPARATUS

Andrew T. Gorman, Pitcairn, Pa., assignor to Westinghouse Air Brake Company, a corporation of Pennsylvania Application October 21, 1949, Serial No. 122,654

9 Claims. (Cl. 303—40)

This invention relates to fluid pressure brakes and more particularly to the type for use on railway locomotives.

As well known, it is customary in braking long freight trains to often release an automatic service application of fluid pressure brakes on the locomotive, while retaining the automatic service application of fluid pressure brakes on the cars, in order to control slack in the train and also to prevent excessive wear, heating and possible loosening of the tires on the locomotive driver wheels.

The 24RL locomotive brake equipment shown and described in Westinghouse Air Brake Company's Instruction Pamphlet No. 5066 dated March 1948 is employed on modern diesel locomotives comprising a multiple of connected units usually including like, leading and trailing A units and one or more like, intermediate or B units. On each of these units there is provided a brake controlling valve device adapted to respond to a reduction in pressure in a brake pipe, extending through the several units of the locomotive for connection with the brake pipe on cars of a train, to apply the fluid pressure brakes on the respective unit when the fluid pressure brakes on a connected train of cars are applied in response to such reduction. An independent release valve device is associated with each of the brake controlling valve devices for operation by fluid under pressure to release the brakes on the unit independent of control from the brake pipe and hence without necessitating release of brakes on the cars of the train. An actuating pipe extends through the several units of the locomotive and to this pipe are connected the independent release valve devices on said units, and also an engineer's independent brake valve device on each of the two A or end units of the locomotive is connected to said pipe through a cut-out valve which on the trailing A unit is closed. The independent brake valve device on the leading A unit is operative to a release position to supply fluid under pressure to the actuating pipe and thence to the several independent release valve devices to operate said release valve devices to release the fluid pressure brakes on the units as above mentioned.

A multiple unit diesel locomotive and the actuating pipe thereon are relatively long, due to which, and due also to resistance to flow of fluid under pressure through said pipe, the pressure of fluid supplied to said pipe by the independent brake valve device on the leading A unit will increase much more rapidly on the leading unit than on the trailing units. As a result, the independent release valve device on the leading unit will operate in response to the pressure of fluid supplied to the actuating pipe to initiate a release of fluid pressure brakes on the leading unit, sooner than the independent release valve devices on the other units will respond to such pressure to initiate a release of the fluid pressure brakes thereon. This is satisfactory if the handle of the independent brake valve device is held in its release position for the necessary and relatively short length of time required to effect a release of brakes on the trailing A unit at which time the release of brakes on all other units of the locomotive will have occurred. However, if the independent brake valve device is held in its release position only long enough to effect a desired release of the fluid pressure brakes on the leading A unit, and which release will be indicated by a gage in the locomotive cab connected to the brake cylinder device on said unit, and is then moved out of release position for venting the actuating pipe, all of the independent release valve devices throughout the locomotive will move out of their brake release position at a time when the brakes on the units to the rear of the leading A unit may be only partially released, since the brakes on the units to the rear of the leading A unit will not start to release as soon as the brakes on the leading A unit. In fact, if the independent brake valve device on the leading A unit is operated to and then out of its release position for releasing the locomotive brakes in steps, observed by the pressure gage connected to the brake cylinder device on said unit, it is possible to effect a full release of brakes on said unit without obtaining any release of brakes on the trailing A unit.

The principal object of the invention is therefore the provision of means for insuring, under conditions such as above described, that an automatic application of fluid pressure brakes on all the units of a multiple unit locomotive will release, as desired, in response to release operation of an engineer's independent brake valve device on one of the leading A units of the locomotive, this object being attained by the provision of means adapted to be added to the 24RL locomotive brake equipment for automatically delaying the release of brakes on the leading A unit of the locomotive, in response to operation of the independent brake valve device thereon to such an extent that such release will occur substantially in unison with the release of brakes on the trailing A unit, and since the brakes on the intermediate B units will release at least as fast as those on the trailing A unit, the desired release of brakes on all units of the locomotive will be assured.

Other objects and advantages will become apparent from the following more detailed description of the invention.

In the accompanying drawings, Figs. 1 to 3, when the right hand edges of Figs. 1 and 2 are matched with the left hand edges of Figs. 2 and 3 respectively, is a diagrammatic view of a fluid pressure brake equipment for a multiple unit locomotive and embodying the invention.

Description

The fluid pressure brake equipment embodying the invention, and for use in a multiple unit locomotive, such as of the diesel type comprising two end A units, either one of which may be at the leading end of the locomotive, and two intermediate B units connected together and to said end units, and which units are indicated in the drawing by suitable legends and separating dot and dash lines, generally may be like that disclosed and described in Patent 2,173,940 issued to E. E. Hewitt et al. on September 26, 1929, modified as in Patent 2,464,977 issued to A. T. Gorman on March 22, 1949. Still further, the brake equipment, less the invention, is fully disclosed in the instruction pamphlet above referred to. In view of these patents and instruction pamphlet the disclosure in the drawings of the present application has been limited and the following description thereof will also be limited to only such as deemed necessary to a clear understanding of the invention.

As shown in the drawings, the brake equipment for the multiple unit locomotive comprises a brake pipe 1 extending through the locomotive for connection at either of the opposite ends of the locomotive to the brake pipe of a train, depending upon which end of the locomotive is to be used for leading the train. The brake equipment for each of the locomotive units comprises a brake controlling valve device 2 in turn comprising a pipe bracket 6 upon which is mounted a service application valve device 7 adapted to respond to a service reduction in pressure in brake pipe 1 for supplying fluid at a proportional pressure to a passage 9 in said bracket for operating a relay valve device 3. The relay valve device 3 on each locomotive unit in turn is adapted to operate in response to such pressure from passage 9 to supply fluid at substantially the same pressure from a main reservoir pipe 23 to a brake cylinder device 5 on the unit for braking the respective unit. When the pressure of fluid thus obtained in the brake cylinder device 5 bears the proper relation to the degree of reduction in brake pipe pressure, the service application valve device 7 will assume a lap position, as well known, for terminating supply of fluid under pressure to the relay valve device 3 and hence to the brake cylinder device 5. Upon an increase in pressure in the brake pipe 1 the service application valve device 7 is adapted to operate to effect a proportional reduction in pressure of fluid in passage 9 and hence in relay valve device 3 which will in turn operate to effect a like reduction in pressure in the brake cylinder device 5 for releasing the brakes on the locomotive unit.

The passage 9 from the service application valve device 7 leads to an interlock valve device 10 mounted on bracket 6 and which comprises a double check valve 11 arranged to be operated by pressure of fluid from passage 9 to open said passage to a passage 12, which through the bracket 6 is connected to a passage 13 leading to one end of another double check valve 14 adapted to respond to such pressure to open passage 13 to an annular cavity 37 and thence to a passage 15 leading to the relay valve device 3, the communication just described constituting the path through which fluid under pressure is adapted to be supplied to and released from said relay valve device 3 by the operation of the service application valve device 7 above described.

The interlock valve device 10 further comprises a selector valve device 16 and an independent release valve device 17. The selector valve device 16 comprises a piston 18 subject on one side to atmospheric pressure in a chamber 19 which is open to atmosphere by a passage 20 and subject on the opposite side to pressure of fluid in a valve chamber 21 which is open through a passage 22 in the bracket 6 to the main reservoir pipe 23 extending through the several units of the locomotive and adapted to be constantly supplied with fluid under pressure, as from a main reservoir 24. A slide valve 25 contained in valve chamber 24 is connected by a stem 26 to piston 18 for movement therewith. The selector valve device further comprises a piston 27 of greater area than piston 18 and arranged coaxially therewith, said piston 27 being exposed at one side to chamber 19 and at the opposite side to a chamber 28 which is open through a passage 29 in the bracket 6 to a pipe 30. On the intermediate B units of the locomotive the pipes 30 are open directly to an acutating pipe 31 extending through the several locomotive units and connected at its opposite ends to two engineer's independent brake valve devices 32, one on each of the A units. According to the invention communication between pipe 30 on the two A units of the locomotive and the actuating pipe 31 thereon is arranged to be controlled by an interlock valve device 33 which will be described in detail later.

When piston chamber 28 in the selector valve device 16 on each locomotive unit is vented by way of the actuating pipe 31, in a manner which will be later described, pressure of fluid in valve chamber 21 acting on piston 18 will move the parts of said device to a normal position, in which they are shown in the drawing, to provide for control of the brakes on the locomotive from the brake pipe 1 along with those on the cars of a train. When fluid under pressure is supplied to the actuating pipe 31 and thereby to piston chamber 28 the piston 27, being of greater area than piston 18, will move the stem 26 and slide valve 25 to an independent brake release position which will also be described in greater detail later.

The independent brake release valve device 17 on each of the locomotive units comprises a check valve 35 contained in a chamber 36 which is open to passage 13 by way of the annular cavity 37 encircling the double check valve 14 and which is arranged to cooperate with a seat 38 for controlling communication between said cavity and an atmospheric passage 39. A spring 34 in chamber 36 acts on the check valve 35 for normally urging it into engagement with its seat 38. The independent release valve device further comprises a flexible diaphragm 40 at one side of which is a chamber 41 and at the opposite side a chamber 42. A stem 44 slidably mounted in the casing and extending through the atmospheric passage 39 for unseating contact with the check valve 35 is provided in chamber 42 with a follower head 45 engaging the adjacent side of diaphragm 40. A spring 46 contained in chamber 42 acts on the follower head 45 for urging the diaphragm 40 and stem 44 to the position in which they are shown in the drawing to permit seating of check valve 35 by spring 34.

Chambers 41 and 42 are connected by passages 47 and 48, respectively, to the seat of slide valve 25 of the selector valve device 16, and are connected to each other through a choked passage 49. A cavity 50 in the slide valve 25 is adapted to open passage 47 to an atmospheric passage 51 when the selector slide valve 25 is in its normal position for thereby venting chamber 41 at one side of diaphragm 40, and at the same time chamber 42 at the opposite side will be vented through the choked passage 49 and passage 47, whereby spring 46 will be rendered effective to hold the diaphragm 40 and stem 44 in the position in which they are shown in the drawing to permit the check valve 35 to be closed by spring 34. With the check valve 35 seated fluid supplied to passage 13 by operation of the service application valve device 7 will be blocked from escape to atmosphere by way of the atmospheric passage 39 so as to actuate the relay valve device 3 to effect an application of brakes on the locomotive as above described. When the selector slide valve 25 is operated to its independent brake release position in response to supply of fluid under pressure to piston chamber 28, passage 47 will be disconnected from the atmospheric passage 51 and a port 52 in the selector slide valve 25 will register with passage 47 to permit flow of fluid under pressure from the selector valve chamber 21 to passage 47 and thence to diaphragm chamber 41. At the same time that fluid is thus supplied to passage 47 a leak of fluid will occur from said passage through the choked passage 49 to passage 48 but a cavity 53 in slide valve 25 at this time opens passage 48 to a passage 54 which is connected through the pipe bracket 6 to an application and release pipe 55 extending through the locomotive and connected to the independent brake valve devices 32 and which will be vented at this time whereby a preponderance in pressure will be obtained in chamber 41 over that in chamber 42 to deflect diaphragm 40 against spring 46 to unseat the check valve 35 from its seat 38. With check valve 35 thus opened the respective relay valve device 3 will be vented by way of passage 15, annular cavity 37 encircling the double check valve 14, the check valve chamber 36, past check valve 35 and thence through the atmospheric passage 39 whereby after a service application of the fluid pressure brakes on the respective unit has been effected by operation of the service application valve device 7 in response to a reduction in pressure in brake pipe 1, such application will be released independent of the pressure of fluid in said brake pipe and hence without necessitating a release of brakes on a connected train, it being understood that at this time the service application valve device 7 will be in lap position terminating supply of fluid under pressure to the relay valve device 3 so that fluid pressure may be released therefrom as above mentioned.

Upon release of fluid under pressure from piston chamber 28 the selector slide valve 25 will be returned to its normal position by pressure of fluid in chamber 21 acting on piston 18 for equalizing fluid pressures in chambers 41, 42 at opposite sides of the diaphragm 40 to permit spring 46 to move the stem 44 out of engagement with the check valve 35 for in turn permitting seating of said check valve by spring 34 whereupon a further application of fluid pressure brakes in response to a reduction in pressure in brake pipe 1 may be effected, if desired.

The reference numerals 57 designates two engineer's automatic brake valve devices, one located on each of the two A units of the locomotive. Each of the brake valve devices 57 comprises a removable handle 58 adapted to be applied only to the brake valve device on the leading A unit and to be operated to effect operation of the brake valve device for charging the brake pipe 1 on the locomotive and cars of a train with fluid under pressure and for also effecting a service reduction in pressure in said pipe for causing a service application of brakes on the locomotive and cars of a connected train in the well known manner. Associated with each of the automatic brake valve devices 57 is a safety control valve device 59 comprising a piston 60 subject on one side to pressure of fluid in a valve chamber 61 and on the opposite side to pressure of fluid in a chamber 62 which is connected to a safety control pipe 63 leading to a safety device 64 such as may be operated by the foot of the engineer. Contained in valve chamber 61 is a valve 65 arranged to be operated by piston 60 upon a reduction in pressure in chamber 62 with respect to pressure of fluid in chamber 61 to effect a service reduction in pressure in brake pipe 1 and thereby an automatic application of brakes on the locomotive and cars of a train. When the pressure of fluid in chamber 62 is equalized with that in chamber 61 through a port 66 in piston 60 a spring 67 is adapted to move said piston to a normal position in which it is shown in the drawing.

The safety device 64 comprises a valved diaphragm 68 for controlling communication between pipe 63 and an atmospheric port 69, and a treadle 70 which when depressed by the foot of the engineer is adapted to actuate said diaphragm for closing said communication. Upon release of foot pressure on treadle 70 the diaphragm 68, aided by pressure of fluid from pipe 63, is adapted to deflect to a position for opening said pipe to the atmospheric passage 69. While the locomotive is being operated the treadle 70 is adapted to be held down by foot pressure of the engineer so that piston 60 and slide valve 65 will assume their normal position in which they are shown in the drawing, but in case the engineer should accidentally or otherwise let up on treadle 70, piston chamber 62 will be vented for causing movement of piston 60 and slide valve 65 to their upper position for effecting an automatic service application of brakes. In detail, the safety control valve device 59 may be like a similar device shown and described in Patent 2,056,283 issued to E. E. Hewitt et al. on September 16, 1941, and also shown in the above mentioned instruction pamphlet, and since devices of this character are so well known a further description thereof is not deemed essential in the present application.

Associated with each automatic brake valve device 57 is a double heading cock 71 controlling communication through pipe 63 from piston chamber 62 to the safety control valve device 64 and also controlling communication through the brake pipe 1 to the brake valve device 57. On the leading A unit of the locomotive the doublehead cock 71 will be placed in a position for opening the two communications controlled thereby, as shown in Fig. 1, but on the trailing A unit of the locomotive said cock will be operated to close these communications, as shown in Fig. 3.

Each of the engineer's independent brake valve devices 32 comprises an independent release valve device 72 arranged to be controlled by vertical movement of a removable handle 73 adapted to be applied only to said brake valve device on the leading A unit of the locomotive. The independent release valve device 72 comprises a fluid pressure supply valve 74 arranged to control communication between a chamber 75 constantly supplied with fluid under pressure from the reservoir pipe 23 and a chamber 76 which is open to the actuating pipe 31 extending through the locomotive. A valve 77 is provided for controlling communication between chamber 76 and thereby the actuating pipe 31 and an atmospheric passage 78. The two valves are connected together by fluted stems 79 engaging each other in chamber 76 and the valve 77 is connected through the medium of a spring 80 and a plunger 81 to a depressible element 82 arranged to be engaged by downward movement of handle 73 from a normal position, in which it is shown in the drawing, about a fulcrum element 83 and against the opposing force of a spring 84. When the handle 73 is thus depressed it is adapted to operate the element 82, plunger 81 and spring 80 to seat valve 77 and open valve 74 for thereby supplying fluid under pressure to the actuating pipe 31 extending through the locomotive. Upon release of handle 73 the spring 84 is adapted to return said handle to its normal elevated position to relieve the valve 77 of pressure from spring 80 and to permit a spring 85 acting on valve 74 to close the latter valve and open the former valve.

Communication between the actuating pipe 31 and each of the independent brake valve devices 32 is controlled through a cock 86 adapted to open this communication on the leading A unit of the locomotive, as for example the unit shown in Fig. 1, and to close such communication on the trailing unit, as shown in Fig. 3.

The interlock valve device 33 on each of the A units comprises a valve 87 arranged to control communication between a chamber 88, open to the actuating pipe 31, and a chamber 89 which is open through a communication containing a choke 91 to pipe 30 on the respective unit. A check valve 90 is arranged in by-passing relation to choke 91 to permit flow of fluid under pressure from pipe 30 to chamber 89 but to prevent reverse flow, the choke 91 being provided to control such reverse flow. The valve 87 is connected to a stem 92 extending through chamber 89 and connecting the valve to a plunger 93 which is slidably mounted in a bore in the casing. An axial passage 94 extends through the valve 87, stem 92 and plunger 93 for opening chamber 88 to a chamber 95 which is connected to the respective pipe 30. The plunger 93 is provided with a seat around the end of passage 94 open to chamber 95 for cooperation with a valve 96 contained in chamber 95 for controlling communication between said chamber and the chamber 88. The valve 96 is connected for movement with a stem 97 extending through a bore in the casing into a chamber 98 which is open to atmosphere through a vent 99. In chamber 98 the stem 97 is provided with a follower head 100 engaging one side of a flexible diaphragm 101 at the opposite side of which is a pressure chamber 102 open to the safety control pipe 63 on the respective locomotive unit. A spring 103 in chamber 98 acts on the follower head 100 and diaphragm 101 to urge them to a position for unseating valve 96 from plunger 93 and to permit closing of valve 87 by a spring 104 acting thereon. A timing reservoir 105 is connected to the pipe 30 on each of the A units.

In operation, on the leading A unit of the locomotive on which the double heading cock 71 and the cock 86 are open, as shown in Fig. 1 of the drawing, and the treadle 70 is depressed the safety control pipe 63 will be charged with fluid under pressure by way of port 66 in piston 60 of the safety control valve device 59 and chamber 102 in the interlock valve device 33 on said unit will, as a consequence, also be charged with fluid under pressure. The diaphragm 101 will therefore be deflected against spring 103 to seat valve 96 and to open valve 87 thereby closing direct communication between actuating pipe 31 and pipe 30 connected to the respective brake controlling valve device 2 and opening said actuating pipe past the valve 87 to pipe 30 via of the check valve 90 and choke 91. On the trailing A unit where the double heading cock 71 is closed and treadle 70 is released of pressure the pipe 63 and thereby diaphragm chamber 102 in respective interlock valve device 33 will be vented, as a result of which, spring 103 will be opening valve 96 and spring 104 will be closing valve 87 so that the actuating pipe 31 on the unit will be open to pipe 30 through chamber 88, the axial bore 94 in the valve 87, stem 92 and plunger 93, past the open valve 96 to chamber 95 and thence to pipe 30 leading to the brake controlling valve device 2 thereon, it being noted that the communication just described bypasses the choke 91.

Now let it be assumed that by operation of the automatic brake valve device 57 on the leading A unit of the locomotive a service reduction in pressure has been effected in brake pipe 1 and that the service portion 7 of the brake controlling valve devices on all units of the locomotive have been operated to supply fluid under pressure to the relay valve devices 3 for applying the brakes on the different units of the locomotives and that said services portions have returned to their lap position.

If the engineer now desires to effect a release of brakes on the locomotive independently of the brake pipe 1 he will depress handle 73 of the independent brake valve device 32 on the leading A unit to close valve 77 and to open valve 74 for thereby supplying fluid under pressure to the actuating pipe 31 extending through the locomotive. On the leading A unit fluid thus applied to the actuating pipe 31 will flow to valve chamber 88 in the interlock valve device 33, thence past the open valve 87 therein to chamber 89 and through choke 91 to pipe 30 leading to the timing reservoir 105 and to piston chamber 28 of the selector valve portion 16 on the respective brake controlling valve device 2. On the B units of the locomotive fluid supplied to the actuating pipe 31 will flow directly to pipe 30 and thence to piston chambers 28 in the respective selector valve devices, while on the trailing A unit fluid under pressure will flow from the actuating pipe 31 directly to the pipe 30 and thence to the selector valve piston chamber 28 by way of the open valve 96 in the respective interlock valve device 33.

On the leading A unit it will be noted that the increase in pressure in pipe 30 by supply from the actuating pipe 31 will be retarded by the combined effect of choke 91 to restrict such supply and the volume 105 the effect of which is to prevent sufficient pressure being obtained in piston chamber 28 of the respective selector valve device 16 to move piston 27 of said device to the position for effecting operation of the independent release valve device 17 to release the brakes on the unit for a period of time which will permit sufficient pressure being obtained in piston chamber 28 of the selector valve device 16 on the trailing A unit to operate said device to cause operation of the independent release valve 17 thereon, whereby the brakes on the leading A unit will be released at substantially the same time as the brakes on the trailing A unit, and since the selector valve devices 16 on the B units obtain fluid pressure directly from the actuating pipe 31 ahead of the selector valve device 16 on the trailing A unit the brakes on the B units will be released at least by the time the brakes on the trailing A unit and thereby on the leading A unit will be released. Thus by delaying the release of brakes on the leading A unit of the locomotive in response to operation of the independent brake valve device 32 thereon, at least the same degree of brake release on all other units of the locomotive will be assured regardless of whether the release is of the continuous complete type or the graduated type.

The cock 86 on the trailing A unit being closed prevents interference with control of brakes by the independent brake valve device 32 thereon.

If the control ends of the locomotive are reversed, the closing of the double heading cock 71 and of cock 86 on the trailing A unit of the locomotive and the opening of these cocks on the leading A unit will provide the same independent control of the brake release on all units from the new leading end as from the end previously used as the leading end.

It is desired to point out that the only purpose of the interlock valve devices 33 on the two A units is to render the choke 91 effective on the leading A unit of the locomotive and ineffective on the trailing A unit in order to delay operation of the selector valve device 16 only on the leading A unit so as to obtain the release of brakes thereon at substantially the same time as on the trailing unit as above described, the pipes 63 on the two A units providing a ready control for selectively conditioning the interlock valve devices 33 according to which A unit is to be employed as the leading unit of the locomotive. If the locomotive were single ended, that is, to be controlled from only one end the relay valve devices 33 and connections with pipe 63 could be dispensed with and the pipe 31 connected directly to pipe 30 through the choke 91 and the check valve 90. The purpose of the check valve 90 by-passing the choke 91 on each A unit is to prevent delay in release of fluid under pressure from the selector piston chamber 28 on the leading A unit upon release of the handle 73 of the independent brake valve device 32 to release fluid under pressure from the actuating pipe 31.

*Summary*

It will now be seen that I have provided means for use in connection with a multiple unit locomotive for insuring a release of the brakes on each of said units in response to release operation of the independent brake valve device on the leading unit and independent of the pressure of fluid in the brake pipe.

Having now described the invention, what I claim as new and desire to secure by Letters Patent, is:

1. In a fluid pressure brake equipment for a multiple unit locomotive, in combination, a brake pipe adapted to extend from end to end of the locomotive, a brake controlling valve device on each unit of the locomotive responsive to a reduction in pressure of fluid in said brake pipe to effect an application of brakes on said unit, brake release means on each unit for effecting a release of said application of brakes thereon, an independent brake valve device on the leading one of said units for effecting operation of said brake release means on all of said units, and means for delaying response of said brake release means on said leading unit to operation of said brake valve device.

2. In a fluid pressure brake equipment for a multiple unit locomotive, in combination, a brake pipe adapted to extend from end to end of the locomotive, a brake controlling valve device on each unit of the locomotive responsive to a reduction in pressure of fluid in said brake pipe to effect an application of brakes on said unit, a second pipe extending through said locomotive, brake release means on each unit responsive to a variation in pressure in said second pipe for releasing said application of brakes on the respective unit, an independent brake valve device on the leading one of said units for effecting said variation in pressure in said second pipe, and means for synchronizing response of said brake release means on said leading unit to response of said brake release means on the unit at the opposite end of the locomotive.

3. In a fluid pressure brake equipment for a multiple unit locomotive, in combination, a brake pipe adapted to extend from end to end of the locomotive, a brake controlling valve device on each unit of the locomotive responsive to a reduction in pressure of fluid in said brake pipe to effect an application of brakes on said unit, a second pipe extending through said locomotive, brake release means on each unit responsive to a variation in pressure in said second pipe for releasing said application of brakes on the respective unit, an independent brake valve device on the leading one of said units for effecting said variation in pressure in said second pipe, and means for delaying response of said brake release means on said leading unit to said variation in pressure in said second pipe with respect to response of said brake release means on the unit at the trailing end of the locomotive.

4. In a fluid pressure brake equipment for a multiple unit locomotive, in combination, a brake pipe adapted to extend from end to end of the locomotive, a brake controlling valve device on each unit of the locomotive responsive to a reduction in pressure of fluid in said brake pipe to effect an application of brakes on said unit, a second pipe extending through the locomotive, an independent brake valve device on the leading one of said units for supplying fluid under pressure to said second pipe, brake release means on each unit arranged to be operative by a chosen pressure of fluid from said second pipe to release said application of brakes on the respective unit, and means on said leading unit for restricting supply of fluid under pressure from said second pipe to the respective brake release means with respect to such supply on the other units.

5. In a fluid pressure brake equipment for a multiple unit locomotive comprising an end unit at either end with one or more intermediate units, in combination, a brake pipe adapted to extend from end to end of the locomotive, an automatic brake controlling valve device on each unit arranged to operate upon a reduction in pressure of fluid in said brake pipe to effect an application of brakes on the respective unit, brake release means on each unit for releasing said application of brakes thereon, an independent brake valve device on each of the end units for effecting operation of brake release means on all of said units, delay means on each of said end units for delaying response of said brake release means on the respective unit to operation of the respective independent brake valve device, and means for rendering said delay means on each unit either effective or ineffective to effect such delay.

6. In a fluid pressure brake equipment for a multiple unit locomotive comprising an end unit at either end with one or more intermediate units, in combination, a brake pipe adapted to extend from end to end of the locomotive, an automatic brake controlling valve device on each unit arranged to operate upon a reduction in pressure of fluid in said brake pipe to effect an application of brakes on the respective unit, an automatic brake valve device on each end unit for effecting a reduction in pressure in said brake pipe, double heading means on each end unit for rendering the respective automatic brake valve device either effective or ineffective to effect a reduction in pressure in said brake pipe, brake release means on each unit for releasing said application of brakes thereon, an independent brake valve device on each of said end units for effecting operation of brake release means on all of said units, delay means on each of said end units for delaying response of said brake release means on the respective unit to operation of the respective independent brake valve device, and means operative upon operation of said double heading means to render the respective automatic brake valve device ineffective to also render the respective delay means ineffective to effect such delay.

7. In a fluid pressure brake equipment for a multiple unit locomotive comprising an end unit at either end and one or more intermediate units, in combination, a brake pipe adapted to extend from end to end of the locomotive, an automatic brake controlling valve device on each unit arranged to operate upon a reduction in pressure of fluid in said brake pipe to effect an application of brakes on the respective unit, an automatic brake valve device on each end unit for effecting a reduction in pressure of fluid in said brake pipe, a second pipe on each unit, a double heading cock on each end unit having one position for rendering said brake valve device effective to reduce the pressure of fluid in said brake pipe and for establishing a fluid pressure charging communication to said second pipe, and having another position for rendering said brake valve device ineffective to reduce the pressure of fluid in said brake pipe and for closing said communication, means for venting said second pipe with said communication closed, brake release means on each unit for releasing said application of brakes thereon, an independent brake valve device on each of the end units for effecting operation of said brake release means on all of said units, delay means on each of said end units operative in response to pressure of fluid in said second pipe to delay response of the respective brake release means to operation of the respective independent brake valve device and rendered ineffective to effect such delay upon venting the respective pipe.

8. In a fluid pressure brake equipment for a multiple unit locomotive comprising an end unit at either end and one or more intermediate units, in combination, a brake pipe adapted to extend from end to end of the locomotive, a brake controlling valve device on each unit arranged to operate upon a reduction in pressure of fluid in said brake pipe to effect an application of brakes on the respective unit, a second pipe extending through the locomotive, an independent brake valve device on each end unit for supplying fluid under pressure to said second pipe, brake release means on each unit arranged to be operated by fluid at a chosen pressure from said second pipe to release said application of brakes on the respective unit, interlock means on each of said end units having one position for establishing a restricted flow communication from said second pipe thereon to the respective brake release means and having another position for establishing a fluid flow communication of greater flow capacity from said second pipe to the respective brake release means, means on each of said intermediate units providing a fluid flow communication from said second pipe thereon to the respective brake release means of substantially the same capacity as provided by said interlock means in its said other position, a double heading cock on each of said end units having a normal position for rendering the respective automatic brake valve device effective to reduce the pressure of fluid in said brake pipe and for effecting movement of the respective interlock means to its said one position and having a double heading position for rendering the respective automatic brake valve device ineffective to reduce the pressure of fluid in said brake pipe, and means for effecting movement of said interlock means to its said other position upon movement of said double heading cock on the respective unit to its double heading position.

9. In a fluid pressure brake equipment for a multiple unit locomotive comprising an end unit at either end and one or more intermediate units, in combination, a brake pipe adapted to extend from end to end of the locomotive, a brake controlling valve device on each unit arranged to operate upon a reduction in pressure of fluid in said brake pipe to effect an application of brakes on the respective unit, a second pipe extending through the locomotive, an independent brake valve device on each end unit for supplying fluid under pressure to said second pipe, brake release means on each unit arranged to be operated by fluid at a chosen pressure from said second pipe to release said application of brakes on the respective unit, interlock means on each of said end units having one position for establishing a restricted flow communication from said second pipe thereon to the respective brake release means and having another position for establishing a fluid flow communication of greater flow capacity from said second pipe to the respective brake release means, means on each of said intermediate units providing a fluid flow communication from said second pipe thereon to the respective brake release means of substantially the same capacity as provided by said interlock means in its said other position, a safety control pipe on each of said end units, a double heading cock on each of said end units having a normal position for rendering the respective automatic brake valve device effective to reduce the pressure of fluid in said brake pipe and for opening a fluid pressure charging communication to the respective safety control pipe and having a double heading position for rendering the respective automatic brake valve device ineffective to reduce the pressure in said brake pipe and for cutting off supply of fluid under pressure to the respective safety control pipe, safety control means on each of said end units operative upon release of manual pressure to vent the respective safety control pipe, and means on each of said end units for effecting movement of the respective interlock means in its one position upon supply of fluid under pressure to the respective safety control pipe and to its other position upon release of fluid under pressure from such safety control pipe.

ANDREW T. GORMAN.

REFERENCES CITED

The following references are of record in the file of this patent:

UNITED STATES PATENTS

| Number | Name | Date |
|---|---|---|
| 2,273,944 | Farmer | Feb. 24, 1942 |
| 2,464,977 | Gorman | Mar. 22, 1949 |